No. 621,330. Patented Mar. 21, 1899.
J. S. DEY.
BRAKE FOR SCALE SUPPORTS.
(Application filed July 13, 1898.)
(No Model.)
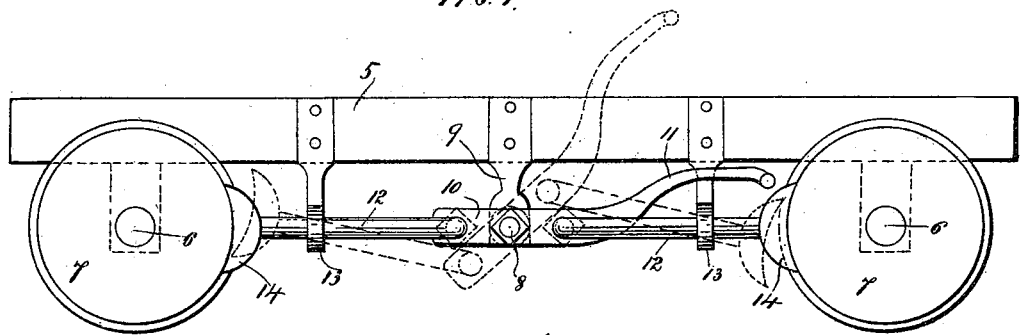
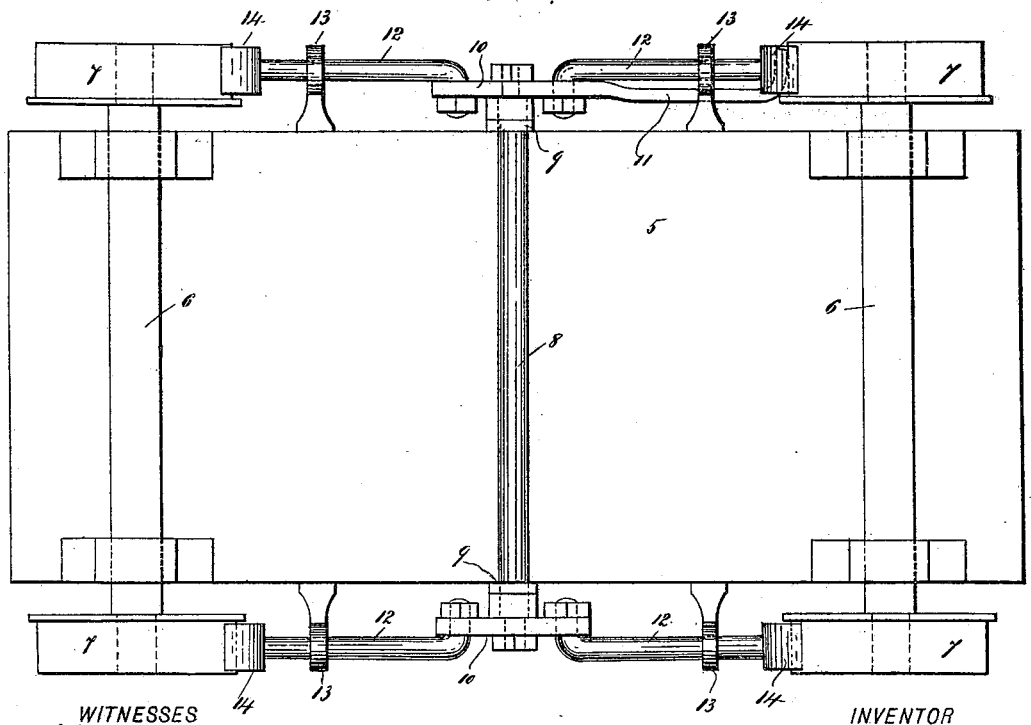
WITNESSES
INVENTOR
John S. Dey
BY
Edgar Tate & Co.
ATTORNEYS
THE NORRIS PETERS CO., PHOTO-LITHO., WASHINGTON, D. C.

UNITED STATES PATENT OFFICE.

JOHN STONAKER DEY, OF CRANBURY, NEW JERSEY.

BRAKE FOR SCALE-SUPPORTS.

SPECIFICATION forming part of Letters Patent No. 621,330, dated March 21, 1899.

Application filed July 13, 1898. Serial No. 685,839. (No model.)

*To all whom it may concern:*

Be it known that I, JOHN STONAKER DEY, a citizen of the United States, residing at Cranbury, in the county of Middlesex and State of New Jersey, have invented certain new and useful Improvements in Scale-Supports, of which the following is a full and complete specification, such as will enable those skilled in the art to which it appertains to make and use the same.

This invention relates to platform-scales, scale-supports, and similar structures or devices; and the object thereof is to provide an improved scale or scale-support of this class comprising a truck-frame provided with axles at each end thereof and wheels connected therewith or mounted thereon and a brake mechanism by which said wheels may be securely locked whenever desired and which is operated entirely from one side of the truck-frame.

The invention is fully disclosed in the following specification, of which the accompanying drawings form a part, in which—

Figure 1 is a side view, and Fig. 2 a plan view, of a device embodying my invention.

In the drawings forming part of this specification, the separate parts of my improvement are designated by the same numerals of reference in each of the views, and in said drawings I have shown at 5 a scale-platform or the platform of a truck which may serve as a support.

The truck frame or platform is provided at each end with an axle 6, which is mounted thereunder, and each of said axles is provided with wheels 7, and mounted transversely of the frame 5 and centrally thereof and beneath the same is a brake-shaft 8, which is preferably mounted in hangers 9 and which is provided at each end with a cross-head 10 secured thereto, one of which is formed at one end into a curved arm or lever 11, and pivotally connected with each end of each of said cross-heads 10 is a brake-rod 12.

The brake-rods 12 pass through hangers 13, which are secured to the sides of the frame 5 and project outwardly and downwardly and in which said rods are adapted to swing vertically, and each of said rods is provided at its free end with a brake-shoe 14, and these brake-shoes are adapted to bear on the wheels 7, and the operation will be readily understood from the foregoing description, when taken in connection with the accompanying drawings and the following statement thereof.

Whenever it is desired to apply the brakes and lock the wheels, the arm or lever 11 of one of the cross-heads 10 is forced downwardly into the position shown in full lines in Fig. 1, and when said lever is in this position both of the cross-heads 10 will be in a horizontal position and the brake-shoes 14 will be forced into contact with the wheels 7 and said wheels will be securely locked, and all that is necessary to release the brake-shoes is to raise the free end of said arm or lever into the position shown in dotted lines in Fig. 1.

When the arm or lever 11 is forced downwardly to the limit of its downward movement, the position of the cross-heads 10 and the brake-rods 12 is such that said parts will remain in such position as to lock the wheels, and the pressure of the brake-shoes on the wheels cannot be released accidentally or by jolt or jar, it being necessary to apply sufficient force to the arm or lever 11 to turn the cross-heads 10 into the position shown in dotted lines in Fig. 1. It will also be seen that the entire apparatus and all the operative parts thereof are located outside of and below the frame 5, and my improvement is simple in construction and operation and well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A device of the character herein described, comprising a frame, an axle mounted under each end thereof, wheels connected with said axles, a brake-shaft mounted centrally of the frame and beneath the same cross-heads connected with each end thereof, brake-rods pivotally connected with each end of said cross-heads, hangers secured to the frame and projecting outwardly and downwardly and through which said brake-rods pass, and brake-shoes connected with the ends of said brake-rods and adapted to bear on said wheels, one of said cross-heads being formed into an arm or lever by which the brake-shaft is operated, substantially as shown and described.

2. A device of the character herein described, comprising a frame, an axle mounted under each end thereof, wheels connected with said axles, a brake-shaft mounted centrally of the frame and beneath the same cross-heads connected with each end thereof, brake-rods pivotally connected with each end of said cross-heads, hangers secured to the frame and projecting outwardly and downwardly and through which said brake-rods pass, and brake-shoes connected with the ends of said brake-rods and adapted to bear on said wheels, one of said cross-heads being formed into an arm or lever by which the brake-shaft is operated, said cross-heads, brake-rods and parts connected therewith being located below and at the sides of the said frame.

In testimony that I claim the foregoing as my invention I have signed my name, in presence of the subscribing witnesses, this 8th day of July, 1898.

JOHN STONAKER DEY.

Witnesses:
F. A. STEWART,
A. C. McLOUGHLIN.